US006214301B1

(12) United States Patent
Taylor et al.

(10) Patent No.: US 6,214,301 B1
(45) Date of Patent: Apr. 10, 2001

(54) HAFNIUM RADIOISOTOPE RECOVERY FROM IRRADIATED TANTALUM

(75) Inventors: Wayne A. Taylor; David J. Jamriska, both of Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/616,762

(22) Filed: Jul. 14, 2000

Related U.S. Application Data

(63) Continuation-in-part of application No. 09/086,688, filed on May 28, 1998, now abandoned.
(60) Provisional application No. 60/079,694, filed on Mar. 27, 1998.

(51) Int. Cl.[7] .......................... C22B 34/00; C22B 59/00; C01G 49/00; B01D 11/00
(52) U.S. Cl. .......................... 423/2; 423/21.1; 423/21.5; 423/68; 423/69; 423/85; 423/139; 423/150.1; 423/157; 423/158
(58) Field of Search .................................. 423/2, DIG. 7, 423/68, 85, 21.1, 21.5, 158, 157, 69, 150.1, 139

(56) References Cited

U.S. PATENT DOCUMENTS

| | | | |
|---|---|---|---|
| 4,772,548 | 9/1988 | Stavrianpoulos | 435/5 |
| 4,830,848 | 5/1989 | Neirinckx et al. | 424/1.1 |
| 5,167,938 | 12/1992 | Heaton et al. | 423/2 |
| 5,434,331 | 7/1995 | Barkatt et al. | 588/1 |
| 5,482,687 | 1/1996 | Taylor et al. | 423/2 |

FOREIGN PATENT DOCUMENTS

| | | | |
|---|---|---|---|
| 1760636 | * 3/1986 | (SU) | 423/2 |

OTHER PUBLICATIONS

Taylor, Wayne A. and David J. Jamriska, "Recovery of Hafnium Radioisotopes from a Proton Irradiated Tantalum Target," 4th International Conference on Methods and Applications of Radioanalytical Chemistry, Kailua–Kona, Hawaii (Apr. 1997).

W. A. Taylor, J. G. Garcia, V. T. Hamilton, R. C. Heaton, D. J. Jamriska, M.A. Ott, D. R. Phillips and S. D. Radzinski, "Recovery of Hafnium Radioistopes from a Proton Irradiated Tantalum Target," J. of Radioanalytical and Nuclear Chemistry, vol. 236, Nos. 1–2, (1998), pp. 155–157, no month.

(List continued on next page.)

Primary Examiner—Steven Bos
(74) Attorney, Agent, or Firm—Gemma Morrison Bennett

(57) ABSTRACT

Hafnium is recovered from irradiated tantalum by: (a) contacting the irradiated tantalum with at least one acid to obtain a solution of dissolved tantalum; (b) combining an aqueous solution of a calcium compound with the solution of dissolved tantalum to obtain a third combined solution; (c) precipitating hafnium, lanthanide, and insoluble calcium complexes from the third combined solution to obtain a first precipitate; (d) contacting the first precipitate of hafnium, lanthanide and calcium complexes with at least one fluoride ion complexing agent to form a fourth solution; (e) selectively adsorbing lanthanides and calcium from the fourth solution by cationic exchange; (f) separating fluoride ion complexing agent product from hafnium in the fourth solution by adding an aqueous solution of ferric chloride to obtain a second precipitate containing the hafnium and iron; (g) dissolving the second precipitate containing the hafnium and iron in acid to obtain an acid solution of hafnium and iron; (h) selectively adsorbing the iron from the acid solution of hafnium and iron by anionic exchange; (i) drying the ion exchanged hafnium solution to obtain hafnium isotopes. Additionally, if needed to remove residue remaining after the product is dried, dissolution in acid followed by cation exchange, then anion exchange, is performed.

49 Claims, 1 Drawing Sheet

OTHER PUBLICATIONS

Rebecca J. Daniels, Patrick M. Grant and Harold A. O'Brien, Jr. "The Protection, Recovery, and Purification of $^{172}$Hf for Utilization in Nuclear Medicine as the Generator of $^{172}$Lu," International Journal of Nuclear Medicine and Biology, vol. 5, pp. 11–17, 1978, no month.

Yu Ts Oganessaint, S. A. Karamiant, Y.P. Gangrskit, B. Gorskit, B. N. Markovt, Z. Szeglowskit, Ch Briancon, D. Ledu, R. Meuniert, "Production, Chemical and Isotopic Separations of the Long–lived Isomer $^{178}$HF$^{m2}$($T_{1/2}$ = 31 years)," Nucl. Part. Phys. vol. 18, (1992) pp. 393–399, no month.

J. B Wilhelmy, G. E. Bentley, K. E. Thomas, Ronald E. Brown, E. R. Flynn, J. Van der Plicht, L. G. Mann and G. L. Struble, "Nuclei from Stability Using Exotic Targets," $4^{th}$ International Conference on Nuclei From Stability, Helsingor, Denmark, Jun. 7–13, 1981, pp. 684–689.

* cited by examiner

HAFNIUM RADIOISOTOPE RECOVERY FROM IRRADIATED TANTALUM

TECHNICAL FIELD

This application is a continuation-in-part application Ser. No. 09/086,688, filed May 28, 1998, now abandoned, which claims the benefit of U.S. Provisional Application No. 60/079,694, filed Mar. 27, 1998.

This invention was made with government support under Contract No. W-7405-ENG-36 awarded by the U.S. Department of Energy. The government has certain rights in the invention.

This invention relates to radioisotope production and radiochemical separations and more particularly to hafnium radioisotope recovery from irradiated tantalum.

BACKGROUND ART

Tantalum is irradiated, generally with protons, for use as a target material. Naturally occurring tantalum having therein tantalum-180 and tantalum-181 is irradiated to form the target materials. After a number of years of decay, depending upon the half-lives of the isotopes, most of the hafnium radioisotopes such as hafnium-172, hafnium-173, hafnium-175 and hafnium-$179^m$ decay away, leaving higher proportionate amounts of hafnium-$178^{m2}$. After the tantalum is irradiated for employment as a target material, it is useful to be able to recover the hafnium radioisotopes for a variety of uses including use as precursors for radioactive materials for medical diagnosis and treatment and use for nuclear physics studies, including use in gamma ray lasers.

Traditionally, separation techniques for recovering hafnium isotopes from irradiated tantalum which has been irradiated employ solvent extractions with reagents that are now considered hazardous. The solvent extraction techniques are now considered problematic because solvent extraction techniques generate a mixed-waste stream containing radioactive and hazardous components that cannot easily be treated for disposal.

Therefore, there is a need for methods of recovering hafnium radioisotopes from irradiated tantalum targets without creation of undesirable waste streams.

It is an object of this invention to provide a method for obtaining hafnium radioisotopes from irradiated tantalum.

It is another object of this invention to provide a solvent-free method for recovering hafnium-$178^{m2}$ from irradiated tantalum.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims appended hereto are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a method for recovering hafnium from irradiated tantalum comprising:

(a) contacting the irradiated tantalum with at least one acid to obtain a solution of dissolved tantalum;

(b) combining an aqueous solution of a calcium compound with the solution of dissolved tantalum to obtain a third combined solution;

(c) precipitating hafnium, lanthanide, and insoluble calcium complexes from the third combined solution to obtain a first precipitate;

(d) contacting the first precipitate of hafnium, lanthanide and calcium complexes with at least one fluoride ion complexing agent to form a fourth solution;

(e) selectively adsorbing lanthanides and calcium from the fourth solution by cationic exchange; (f) separating fluoride complexing agent product from hafnium in the fourth solution by adding an aqueous solution of ferric chloride, adjusting the solution to an alkaline pH, and heating to obtain a second precipitate containing the hafnium and iron;

(g) dissolving the second precipitate containing the hafnium and iron in acid to obtain an acid solution of hafnium and iron;

(h) selectively adsorbing the iron from the acid solution of hafnium and iron by anionic exchange;

(i) drying the ion exchanged hafnium solution to obtain hafnium-$178^{m2}$, hafnium-172 and lutetium-172.

Additionally, if needed to remove residue remaining after the product is dried, dissolution in acid followed by an additional cation exchange, then a second anion exchange, can be performed.

BRIEF DESCRIPTION OF THE DRAWINGS

The accompanying drawing, which is incorporated in and forms a part of the specification, illustrates an embodiment of the present invention and, together with the description, serves to explain the principles of the invention.

BEST MODES FOR CARRYING OUT THE INVENTION

Figure 1:
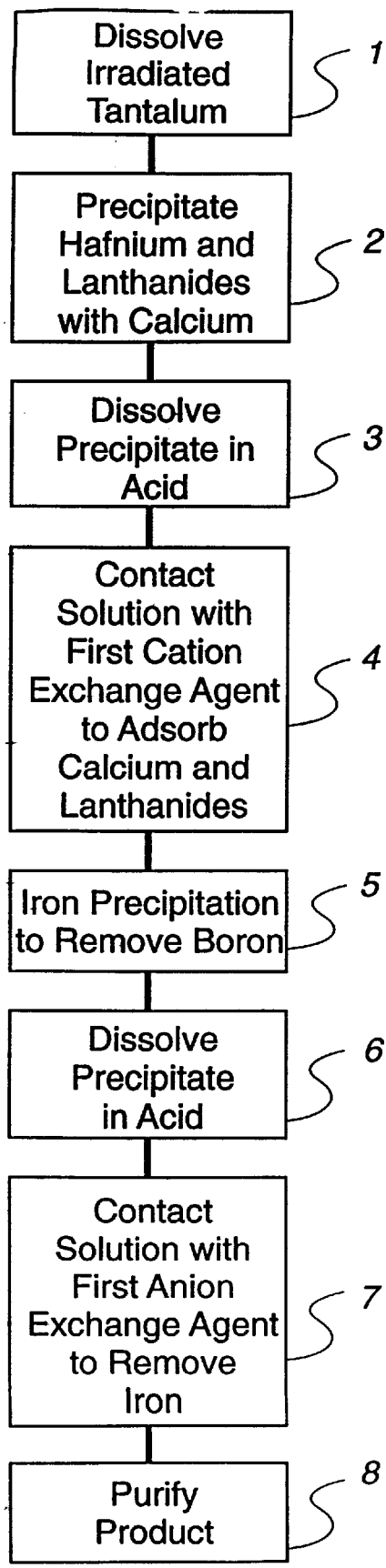
FIG. 1 is a flow diagram illustrating steps of the invention.

There has been discovered a method of obtaining hafnium from irradiated tantalum without use of solvent extraction techniques. Precipitation and ion exchange techniques are used to recover a hafnium fraction of high purity from irradiated tantalum without the use of organic solvents that are considered hazardous materials. The invention is particularly useful for recovery of hafnium isotopes from proton irradiated tantalum targets.

Generally hafnium recovery from pure elemental tantalum which has been proton irradiated is presently preferred for the practice of the invention. However, successful hafnium recovery can be made from irradiated tantalum alloys or tantalum containing minor amounts of other materials.

The tantalum can be irradiated with protons, deuterons or other atomic species. Proton irradiated tantalum is generally preferred because of the higher proportion of desired hafnium isotopes produced by proton irradiation.

The irradiated tantalum can be in solid, shaved, or powdered form. Solid irradiated tantalum can be in whatever shape is convenient, although shapes such as plates with enough surface area to facilitate dissolution are generally preferred.

Although aging of the irradiated tantalum is not necessary for recovering hafnium isotopes, the tantalum can be aged for a period of years to enhance recovery of particular isotopes. Aging the irradiated tantalum prior to the hafnium recovery process enhances the ratio of long lived hafnium-$178^{m2}$ to other shorter lived hafnium radioisotopes present in the tantalum.

When the irradiated tantalum is aged, generally a period of aging in the range from about ten years to about twenty years is most useful because most of the shorter lived hafnium radioisotopes will have decayed out without a significant loss of the hafnium-$178^{m2}$ which has a thirty-one year half life.

The tantalum is first dissolved in at least one acid to obtain a solution of tantalum. Presently preferred is a mixture of hydrofluoric and nitric acid because of the superior effectiveness of this particular mixture of acids and because the hydrofluoric acid can provide halide ions for subsequent steps in the invention process.

An amount and concentration of acid or acids sufficient to dissolve the tantalum is needed. When a combination of hydrofluoric acid and nitric acid is used, a large range of ratios of amounts of the two acids can be employed in this step of the invention method. Generally useful are combinations with amounts of hydrofluoric acid in the range from about 5 volume percent to about 95 volume percent. Presently more preferred are combinations of the two acids with amounts of hydrofluoric acid in the range from about 20 volume percent to about 80 volume percent. Presently most preferred are combinations of the two acids with amounts of hydrofluoric acid in the range from about 25 volume percent to about 75 volume percent.

Concentrations of hydrofluoric acid which are useful in combination with nitric acid for dissolving the irradiated tantalum are those in the range from about 5 molar to about 29 molar. Presently more preferred are ranges of concentrations of hydrofluoric acid from about 10 molar to about 29 molar.

Use of too little hydrofluoric acid or too low a concentration of hydrofluoric acid will result in exceedingly slow dissolution and increased volume of the reaction mixture needed for dissolution of the tantalum. Use of an excess of hydrofluoric acid will slow the dissolution with increased volume of reaction mixture needed for subsequent steps in the invention process.

Concentrations of nitric acid which are useful for dissolving the irradiated tantalum are those in the range from about 2 molar to about 16 molar. Presently more preferred are ranges of concentrations of nitric acid from about 5 molar to about 16 molar. Presently most preferred are ranges of concentrations of nitric acid from about 14 molar to about 16 molar.

Use of too little nitric acid or too low a concentration of nitric acid will result in exceedingly slow dissolution and increased volume of the reaction mixture needed for dissolution of the tantalum. Use of too much nitric acid will cause slowed dissolution with increased volume of reaction mixture needed for subsequent ion exchange steps.

During dissolution of the tantalum in the acid or acids, cooling may be needed to slow the reaction rate. Any convenient means of cooling known in the art such as use of inert cooling coils or dilution of the acids with water may be used. Means of cooling such as use of dry ice are generally preferred since addition of reagents or contaminants can thusly be avoided.

The resulting solution of dissolved tantalum is then filtered to obtain a clear homogenous filtrate.

In a second step tantalum is removed from the filtrate. An aqueous solution of a calcium compound is combined with the filtrate and the resulting solution is centrifuged to obtain a precipitate of hafnium, lanthanides, and calcium complexes.

Calcium compounds which are useful for combining with the tantalum filtrate are those which are easily soluble in aqueous solutions. Generally calcium compounds presently preferred include, but are not limited to, calcium nitrate and calcium chloride. Presently most preferred is calcium nitrate because it is quite soluble in water, readily available and does not add additional counterions.

The concentration of calcium compound in the aqueous solution which is combined with the tantalum filtrate needs to be sufficiently high to co-precipitate the hafnium. An amount of calcium compound in the range from about 25 to about 1000 milligrams of calcium for each liter of solution is generally useful in the invention. More preferable is an amount of calcium compound in the range from about 50 to about 500 milligrams of calcium for each liter of solution. Generally presently preferred is an amount of calcium compound in the range from about 50 to about 100 milligrams of calcium for each liter of solution.

Use of too little calcium compound will result in incomplete co-precipitation of the hafnium. Use of too much calcium compound will cause a need for a larger cation column and larger volumes of solution to be processed in subsequent steps.

The aqueous solution of calcium compound and tantalum filtrate is then centrifuged to precipitate out a mixture of calcium compound (calcium fluorides), lanthanides, and hafnium.

The step of adding an aqueous solution of calcium compound to the tantalum filtrate and centrifuging can be repeated as needed to obtain a filtrate which is free of hafnium isotopes.

The resulting first precipitate of hafnium, lanthanides and calcium fluoride complexes is broken up, and washed with water to obtain a solution with a minimum of tantalum contamination.

In a third step, the washed precipitate of hafnium, lanthanides, and calcium fluoride complexes is combined with at least one concentrated acid and an acid for further acid addition. The concentrated acid and acid for further acid addition can be added sequentially, added simultaneously, or combined and added as a mixture to the hafnium, lanthanide and calcium complex precipitate. Presently it is preferred to first combine the precipitate with at least one concentrated acid to form a slurry, and then, with further addition of acid, form a solution.

The concentrated acid generally presently preferred for forming the slurry is hydrochloric acid or nitric acid because of ease of dealing with reaction products in the subsequent chemistry. Boric acid is generally preferred for the further addition of acid to form the solution because boric acid readily complexes with the fluoride ions.

Hydrochloric acid or nitric acid concentrations which are useful in the practice of the invention are those which are sufficient to provide protons needed to dissolve the precipitate. Generally, concentrations of hydrochloric acid or nitric acid presently preferred are in the range from about 0.1 molar to about 12 molar. Presently more preferred are concentrations of hydrochloric acid in the range from about 10 molar to about 12 molar.

Boric acid concentrations which are useful in the practice of the invention are those which are sufficient to efficiently complex with all the fluoride ions present. Generally, concentrations of boric acid presently preferred are in the range from about 0.1 molar to total saturation. Presently most preferred are concentrations of boric acid in the range from about 0.01 molar to about 0.4 molar.

The ratios of amounts of hydrochloric acid or nitric acid to boric acid are not generally important and a wide range of amounts can be employed as long as there is enough boric acid to complex with the fluorides and enough concentrated acid to dissolve the precipitate. Generally useful are combined amounts of the two acids with amounts of hydrochloric acid in the range from about 5 volume percent to about 95 volume percent. Presently more preferred are combinations of the two acids with amounts of hydrochloric acid in the range from about 20 volume percent to about 80 volume percent. Presently most preferred are combinations of the two acids with amounts of hydrochloric acid in the range from about 25 volume percent to about 75 volume percent.

If too little hydrochloric acid, nitric acid or too little boric acid is used, the precipitate will not go back into solution. Employment of too low a concentration of hydrochloric acid or nitric acid will result in incompletely solubilized precipitate.

Use of too low a concentration of a concentration of boric acid will result in incomplete dissolution of the precipitate and incomplete complexing of the fluoride.

Use of too much or too high a concentration of hydrochloric acid or nitric acid will necessitate dilution of the solution to a much greater degree before cation exchange because the excess protons would compete for the reaction sites in the cation exchange column.

Use of too much boric acid or too high a concentration of boric acid will cause excesses of boron which would need to be removed in subsequent steps.

Stirring and heating is employed during addition of boric acid to the slurry to form a concentrated acid/boric acid solution of the hafnium, lanthanides, and calcium ions. The volume of the hydrochloric acid/boric acid solution is adjusted as needed by addition of water to facilitate cation exchange in the subsequent step.

Products remaining or formed as a result of reaction of the precipitate with the acid or acids include an acid solution of lanthanides and hafnium, having therein borofluoro complexes and ions, and calcium, fluorine and chlorine ions.

In a fourth step a suitable cation exchange agent is then contacted with the acid solution of the hafnium and lanthanides to remove selectively the lanthanides and calcium complexes, leaving hafnium and boron in the acid solution. Any conventional cation exchange agent capable of adsorbing or trapping the lanthanide and calcium cations can be used. The cation exchange resin is preferably a strong acid resin such as Biorad™ AG 50Wx8, available from Bio-Rad Laboratories. The mesh size of the cation exchange resin can be from about 50 mesh to about 400 mesh, more preferably from about 100 mesh to about 200 mesh.

In a fifth step the boron is then separated from the hafnium in the acid solution which has been cation exchanged. An aqueous solution of ferric chloride is added, the pH of the combined solution is adjusted to an alkaline pH, and the alkaline solution is heated to obtain a precipitate containing the hafnium and iron but not the boron.

An amount of ferric chloride sufficient to coprecipitate the hafnium is needed. The amount of ferric chloride needed will depend upon the concentration of hafnium in the acid solution. An amount in the range from about 50 mg/L of cation exchanged acid solution to large excesses is generally useful in the invention. Generally presently preferred is an amount of ferric chloride in the range from about 0.05 to about 0.5 weight percent. Use of too little ferric chloride will result in incomplete co-precipitation of the hafnium. An excessive amount of ferric chloride will cause a need for use of more extensive separations chemistry in subsequent steps.

The pH of the aqueous ferric chloride solution combined with the cation exchanged acid solution is adjusted by addition of appropriate amounts of ammonia or other suitable basic agents. A pH of at least 6 is needed to enable co-precipitation of the hafnium. Presently preferred is a pH of at least 9.

The resulting alkaline solution is then heated by any suitable means and precipitated to obtain a precipitate containing the hafnium but not the boron, which stays in the solution complexed with the ammonia, sodium hydroxide or other base used to adjust the pH.

The hafnium precipitate thusly obtained is centrifuged and washed with a basic solution such as diluted ammonia, to maintain an alkaline pH.

When ammonia is used, concentrations of ammonia which are useful for washing the hafnium precipitate which has been separated from the boron are those which are sufficiently alkaline to keep the precipitate at a pH of 4 or higher. Generally, concentrations of ammonia presently preferred are in the range between 0.01 molar and 1 molar. Presently most preferred are concentrations in the range from about 0.05 to about 0.1 molar.

An amount of ammonia sufficient to completely wash the precipitate is needed. Depending upon the amount of precipitate, an amount in the range from about 1 mL/g of precipitate to about 50 mL/g of precipitate is generally usefull in the invention. More preferable is an amount of ammonia in the range from about 2 mL/g to about 10 mL/g. Generally presently most preferred is an amount of ammonia in the range from about 5 mL/g to about 8 mL/g. Use of too little ammonia will result in incomplete removal of boron. Use of too much ammonia will cause increased waste volume and possible loss of hafnium.

Following one or more basic solution washes, water washes used to remove ammonia residues from the hafnium and ferric hydroxides which have formed. Generally, two or more washes with water may be needed to remove all of the ammonia.

In a sixth step, the washed precipitate of hafnium and iron hydroxides is then dissolved in a concentrated acid such as hydrochloric acid to obtain an acid solution.

Acid concentrations which are useful in this step of the invention process are those which will cause the ferric component of the solution to adsorb on or be trapped by the anion resin in the anionic exchange column. Generally, when hydrochloric acid is used, presently preferred concentrations are in the range from about 2 molar to about 12 molar. Presently most preferred are concentrations of hydrochloric acid in the range from about 6 molar to about 8 molar.

Use of too little hydrochloric acid or too low a concentration of hydrochloric acid will result in incomplete removal of the ferric component by the anion exchange agent in the subsequent step.

In a seventh step, the acid solution containing the hafnium and iron is then subjected to anion exchange to remove the iron, leaving the hafnium. An anion exchange resin capable of adsorbing the ferric ions is used. The anion exchange resin is preferably a strongly basic anion resin and can be, for example, a resin such as Biorad™ AG 1×8, available from Bio-Rad Laboratories. This ferric precipitation step may need to be repeated to remove the last traces of boron from the hafnium product.

The acid solution of hafnium from which the iron has been adsorbed can then be dried by any convenient means to obtain the hafnium isotopes. Depending upon how the tantalum is irradiated, hafnium-178$^{m2}$, hafnium-172, and lutetium-172 are generally obtained. The lutetium-172 is a decay product of the hafnium-172. Selective irradiation with different energies can be used to obtain products having different hafnium isotopic ratios.

Additionally, if needed to remove residue remaining after the product containing hafnium isotopes is dried, dissolution of the product in acid followed by an additional cation exchange and anion exchange can be performed. For example, the anion exchanged product which has been dried can be converted to a 0.1 molar solution of hydrochloric acid which is then contacted with a cation exchange agent. The cation exchange column is then washed to remove any trace anions which were introduced through reagent addition or any residues not already removed. The washing is accomplished with 0.1 molar solution. The hafnium isotopes are then removed from the ion exchange column using 8 molar hydrochloric acid solution. The solution is then converted to an 11 molar hydrochloric acid solution by addition of concentrated hydrochloric acid or by drying and addition of 11 M hydrochloric acid. The 11 molar hydrochloric acid solution is then contacted with an anion exchange agent to remove cations introduced by reagents or not removed in previous steps.

Although the embodiment of the invention process described above results in a product containing hafnium-178$^{m2}$, hafnium-172, and lutetium-172, irradiation with different energies can be used to obtain products having different ratios of hafnium radioisotopes.

The invention process is an organic solvent-free method which can be used to obtain hafnium radioisotopes from irradiated tantalum without production of the mixed waste streams associated with the state of the art technology which uses solvent extraction methods for separation of hafnium isotopes from irradiated tantalum.

The present invention is more particularly described in the following example which is intended as illustration only, since numerous modifications, equivalents and variations will be apparent to those skilled in the art.

EXAMPLE

A sample of naturally occurring tantalum was used to demonstrate the operability of the invention. No effort was made to acquire high purity tantalum.

Three square tantalum plates 8 cm on a side and 0.3 cm thick were bolted together with intervening aluminum spacers to from a target. The approximately ⅛" spaces between the tantalum plates allowed cooling water to flow between the tantalum plates.

The total mass of the target was 1003.3 grams.

The target was placed in an aluminum target carrier without any additional encapsulation and inserted into a linear accelerator beam at a location whereby the target was irradiated with 600–800 MeV protons at an integrated beam intensity of about 350 micro amperes for a period of 60 days. This amount of current and energy gave an integrated current of 401,000 micro ampere hours to the targeting facility. Because earlier experiments had indicated that 10% of the beam was deposited in each proceeding target, it was estimated that the tantalum target received approximately 192,000 micro ampere hours of irradiation.

After irradiation the irradiated tantalum target was aged for 15 years at atmospheric pressure and ambient temperature.

The spacers were removed before dissolution of the target.

Although the addition of stable hafnium is sometimes used to make the chemistry easier, that method compromises the usefulness of the final product; so no additional hafnium had been added as a carrier in these test runs.

The aged target was dissolved in a mixture of 4 parts hydrofluoric acid and 1 part nitric acid. The reaction proceeded quite quickly with the generation of sufficient heat to boil off most of the acid during dissolution of the tantalum metal.

The acid was not diluted to control the reaction because it was desired to minimize the volume to simplify further chemical steps and to keep the amount of waste produced to a minimum. Cooling was accomplished by adding enough dry ice to the reaction mixture to keep the reaction calm. Cooling caused by the dry ice slowed the reaction rate without addition of unwanted reagents or diluents.

The final volume of the dissolved tantalum solution was 2.7 liters.

The 2.7 liter dissolved tantalum solution was filtered using a medium frit Buchner funnel.

The dissolved tantalum target solution and filter were counted separately with an intrinsic germanium detector to assure that all of the hafnium activity was in the solution and no hafnium activity was in the filter.

A calcium fluoride co-precipitation was then performed to separate the hafnium and lanthanide fractions from the dissolved tantalum target solution. First, calcium nitrate was dissolved in water to obtain an aqueous solution with a concentration of about 10 mg/mL.

The calcium nitrate solution was added to the tantalum target solution to form an aqueous tantalum/calcium fluoride precipitate mixture. The tantalum/calcium fluoride precipitate mixture was then centrifuged and the remaining solution again analyzed with the germanium detector for gamma emitters to determine hafnium activity.

Counting a sample of the solution with the intrinsic germanium detector showed that 80% of the hafnium activity in the aqueous mixture had been removed by the centrifuging and removal of solids.

The precipitation and centrifugation steps were repeated with 85% of the remaining hafnium activity being removed from the mixture for a 97% total hafnium activity recovery.

The centrifuged precipitate was washed with water using a vortex mixer to break it up. The washed precipitate was then again centrifuged. The wash solutions from each of the washes were combined and counted. No significant amount of hafnium activity was found in the wash solutions.

After the calcium fluoride precipitation was completed, a cation exchange procedure was employed to separate the hafnium from the calcium and lanthanide fraction after dissolution of the precipitate. Using a vortex mixer to break up the precipitate, the material was slurried with 9 mL of concentrated hydrochloric acid into a flask. With stirring and warming, 10 grams of boric acid was added to bring the precipitate into solution.

The precipitate solution was then adjusted with water to 250 mL or 0.4 M in hydrochloric acid. The acidified precipitate solution was run through a 100 mL Biorad™ AG 50×8 100–200 mesh cation exchange column. Hafnium and boron passed through the cation exchange column. The lanthanides and calcium were retained in the cation exchange column.

Treatment in the cation exchange column was followed by a 500 mL 0.1 M hydrofluoric acid wash to obtain a 0.4 molar solution of hafnium and boron.

Then, 500 mL of 6 M hydrochloric acid was used to strip the lanthanide fraction and the calcium together from the column.

An iron precipitation method was chosen for separation of the boron from the hafnium. An aqueous solution of ferric chloride containing 50 mg of iron was added to the 0.4 M HCl solution containing the hafnium and boron. The ferric chloride treated solution was then pH adjusted to about 10 by the addition of ammonia to form an alkaline solution. The alkaline solution was digested.

The ferric hydroxide precipitate contained the hafnium fraction while the boron remained in solution.

The precipitate containing the hafnium fraction was centrifuged and the precipitate washed with dilute ammonia (0.1 M) using a vortex mixer. The precipitate containing the hafnium was centrifuged a second time and the supernatant solution removed.

The ammonia washing procedure was repeated twice more using water in place of the ammonia. The washed precipitate was then dissolved in 6 M hydrochloric acid and passed through a 10 mL Biorad™ AG 1×8 100–200 mesh anion exchange column. This iron precipitation step was repeated once to remove all traces of boron.

Radiochemically pure hafnium remained, but contained some residue of inorganic materials when taken to dryness.

For a final removal of any remaining stable contaminants, a cation and then an anion exchange procedure was performed. The hafnium activity was brought up in 30 mL of 0.1 M hydrochloric acid and placed on a 10 mL Biorad™ AG 50×8 cation exchange column, followed by two 10 mL 0.1 M hydrochloric acid washes.

The hafnium activity was stripped from the column with 100 mL of 8 M hydrochloric acid was evaporated to near dryness by heating using a hot plate and condenser. The hafnium fraction was then combined with 10 mL of 11 M hydrochloric acid and placed on a 10 mL Biorad™ AG 1×8 100–200 mesh anion exchange column. After washing the column with two 10 mL batches of 11 M hydrochloric acid, the hafnium activity was stripped with 1 M hydrochloric acid resulting in the final product.

The final product was characterized for both radioactive isotopes and stable elemental contaminants. Counting with an intrinsic germanium detector revealed that the only radioactive species present were hafnium-$178^{m2}$, hafnium-172 and lutetium-172.

Analysis for stable material by emission spectroscopy showed 500 micrograms of sodium as the only measurable contaminant. The sodium was believed to have been introduced through reagents.

The total mass of all hafnium isotopes in the product was 16.3 mg, representing 65% radiochemical recovery. It is believed that the bulk of the unrecovered material was lost during efforts to develop a method to separate the boron from the hafnium before selecting the iron precipitation method. The total amount of hafnium radioisotopes recovered from the irradiated tantalum sample was 0.53 millicuries hafnium-$178^{m2}$ and 6.2 millicuries of hafnium-172.

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof.

INDUSTRIAL APPLICABILITY

Using this invention process, hafnium radioisotopes can be recovered from irradiated tantalum materials without creating the hazardous waste streams produced by solvent extraction methods.

Hafnium radioisotopes obtained by the invention methods are precursors for radioactive materials which can be used for medical diagnosis and treatment. Hafnium isotopes obtained by use of the invention process can be useful for nuclear physics studies, including use in gamma ray lasers.

The hafnium-$178^{m2}$ nucleus, with its long half-life of 31 years and high-spin isomeric state ($16^+$) is desired for nuclear physics studies including use in gamma ray lasers. The hafnium-172 and its daughter lutecium-172 can be used as a biomedical generator.

What is claimed is:

1. A method for obtaining hafnium radioisotopes from irradiated tantalum containing lanthanides and hafnium comprising:
   (a) contacting the irradiated tantalum with at least one acid to obtain a solution of dissolved tantalum;
   (b) combining an aqueous solution of a calcium compound with the solution of dissolved tantalum to obtain a third combined solution;
   (c) precipitating hafnium, lanthanide, and insoluble calcium complexes from the third combined solution to obtain a first precipitate;
   (d) contacting the first precipitate of hafnium, lanthanide and calcium complexes with at least one fluoride ion complexing agent to form a fourth solution;
   (e) selectively adsorbing lanthanides and calcium from the fourth solution by cationic exchange;
   (f) separating fluoride ion complexing agent product from hafnium in the fourth solution by adding an aqueous solution of ferric chloride, adjusting the solution to an alkaline pH, and heating to obtain a second precipitate containing the hafnium and iron;
   (g) dissolving the second precipitate containing the hafnium and iron in acid to obtain an acid solution of hafnium and iron;
   (h) selectively adsorbing the iron from the acid solution of hafnium and iron by anionic exchange;
   (i) drying the ion exchanged hafnium solution to obtain hafnium isotopes.

2. A method as recited in claim 1 wherein said irradiated tantalum is pure elemental tantalum.

3. A method as recited in claim 1 wherein said irradiated tantalum is a tantalum alloy.

4. A method as recited in claim 1 wherein said irradiated tantalum contains minor amounts of other materials.

5. A method as recited in claim 1 wherein said irradiated tantalum has been irradiated with protons.

6. A method as recited in claim 1 wherein said irradiated tantalum is in solid form.

7. A method as recited in claim 1 wherein said irradiated tantalum is in shaved form.

8. A method as recited in claim 1 wherein said irradiated tantalum is in powdered form.

9. A method as recited in claim 1 wherein said irradiated tantalum has been aged.

10. A method as recited in claim 9 wherein said irradiated tantalum has been aged for a period in the range from about ten years to about twenty years.

11. A method as recited in claim 1 wherein said at least one acid in step (a) is hydrofluoric acid.

12. A method as recited in claim 1 wherein said at least one acid in step (a) is nitric acid.

13. A method as recited in claim 9 wherein said at least one acid in step (a) is a mixture of hydrofluoric and nitric acid.

14. A method as recited in claim 1 wherein the reaction mixture is cooled during contacting of said irradiated tantalum with said at least one acid.

15. A method as recited in claim 1 wherein said solution of dissolved tantalum from step (a) is filtered prior to step (b).

16. A method as recited in claim 1 wherein said aqueous solution of a calcium compound is an aqueous solution of calcium nitrate.

17. A method as recited in claim 1 wherein said aqueous solution of a calcium compound is an aqueous solution of calcium chloride.

18. A method as recited in claim 1 wherein an amount of said aqueous solution of a calcium compound sufficient to coprecipitate said hafnium is used in step (b) to obtain said third combined solution.

19. A method as recited in claim 18 wherein said calcium compound is present in an amount in the range from about 25 to about 1000 milligrams of calcium for each liter of solution.

20. A method as recited in claim 1 wherein steps (a), (b) and (c) are repeated in sequence more than once.

21. A method as recited in claim 1 wherein said first precipitate of step (c) is washed with an aqueous solution prior to step (d).

22. A method as recited in claim 1 wherein stirring and heating is employed during contacting of said first precipitate with said fluoride ion complexing agent in step (d).

23. A method as recited in claim 1 wherein said fluoride ion sequestering agent in step (d) is boric acid and said fluoride ion complexing agent product in step (f) is boron.

24. A method as recited in claim 1 wherein said first precipitate is contacted with a concentrated acid in addition to contacting said first precipitate with said fluoride ion complexing agent.

25. A method as recited in claim 24 wherein said first precipitate is contacted with said concentrated acid and said fluoride ion complexing agent simultaneously.

26. A method as recited in claim 24 wherein said first precipitate is contacted with a mixture of said concentrated acid and said fluoride ion complexing agent.

27. A method as recited in claim 24 wherein said first precipitate is contacted with said concentrated acid prior to being contacted with said fluoride ion complexing agent.

28. A method as recited in claim 24 wherein said concentrated acid is one chosen from the group of hydrochloric acid and nitric acid.

29. A method as recited in claim 24 wherein said concentrated acid in step (d) is in the range from about 0.1 molar to about 12 molar.

30. A method as recited in claim 1 wherein said fluoride ion complexing agent (d) is an acid in the range from about 0.1 molar to total saturation.

31. A method as recited in claim 1 wherein the reaction mixture is stirred and heated during contacting of said first precipitate in step (d).

32. A method as recited in claim 1 wherein a strong acid is used to form a slurry of the precipitate prior to said cationic exchange in step (e).

33. A method as recited in claim 1 wherein said ferric chloride in step (f) is in an amount sufficient to coprecipitate said hafnium.

34. A method as recited in claim 1 wherein pH of said fourth solution is adjusted to an alkaline pH during addition of said aqueous solution of ferric chloride in step (f).

35. A method as recited in claim 1 wherein said fourth solution is heated during addition of said aqueous solution of ferric chloride in step (f).

36. A method as recited in claim 34 wherein the pH of said aqueous solution of ferric chloride in step (f) is adjusted with ammonia.

37. A method as recited in claim 34 wherein the pH of said aqueous solution of ferric chloride in step (f) is adjusted with sodium hydroxide.

38. A method as recited in claim 1 wherein said second precipitate obtained from step (f) is washed with a basic solution prior to dissolution in acid in step (g).

39. A method as recited in claim 38 wherein said basic solution is diluted ammonia.

40. A method as recited in claim 39 wherein said diluted ammonia has a concentration sufficient to keep said second precipitate at a pH of 4 or higher.

41. A method as recited in claim 38 wherein said second precipitate obtained from step (f) is washed more than once.

42. A method as recited in claim 38 wherein after said second precipitate is washed with said basic solution said second precipitate is washed once or more with an aqueous solution.

43. A method as recited in claim 1 wherein said acid in step (g) is hydrochloric acid.

44. A method as recited in claim 43 wherein said hydrochloric acid is in the range from about 2 molar to about 12 molar.

45. A method as recited in claim 1 wherein a strong base is used to adjust the pH of said solution of hafnium and iron in said anionic exchange in step (h).

46. A method as recited in claim 1 wherein steps (g) and (h) are repeated.

47. A method as recited in claim 1 wherein said hafnium isotopes of step (i) are dissolved in acid followed by an additional cation exchange and anion exchange.

48. A method as recited in claim 1 wherein said hafnium isotopes of step (i) are hafnium-178$^{m2}$, hafnium 172 and lutetium-172.

49. A method as recited in claim 1 further comprising:

(j) selectively irradiating said hafnium isotopes to alter hafnium isotopic ratios in said hafnium isotopes.

* * * * *